United States Patent [19]

Ladd et al.

[11] Patent Number: 5,117,451
[45] Date of Patent: May 26, 1992

[54] INTERFACE TO AND OPERATION OF A VOICE MESSAGING SYSTEM

[75] Inventors: David J. Ladd, Saratoga; Gregory E. Pounds, San Jose; Tim J. Kusumi, Los Gatos; Peter A. Bonee, Sunnyvale; Robert R. Shepard, Fremont, all of Calif.

[73] Assignee: VMX/OPCOM, San Jose, Calif.

[21] Appl. No.: 509,089

[22] Filed: Apr. 16, 1990

Related U.S. Application Data

[63] Continuation of Ser. No. 159,783, Feb. 24, 1988, Pat. No. 4,926,462.

[51] Int. Cl.⁵ .................. H04M 3/50; H04M 3/54
[52] U.S. Cl. ............................ 379/67; 379/89; 379/212; 379/214; 379/245
[58] Field of Search .............. 379/67, 88, 89, 211, 379/212, 214, 233, 245, 246

[56] References Cited

U.S. PATENT DOCUMENTS

| | | | |
|---|---|---|---|
| 4,484,031 | 11/1984 | Gray et al. | 379/212 |
| 4,696,028 | 9/1987 | Morganstein et al. | 379/88 |
| 4,747,124 | 5/1988 | Ladd | 379/67 |
| 4,757,267 | 7/1988 | Riskin | 379/113 |
| 4,763,353 | 8/1988 | Canale et al. | 379/157 |
| 4,766,604 | 8/1988 | Axberg | 379/67 |
| 4,792,967 | 12/1988 | Ladd et al. | 379/67 |
| 4,809,321 | 2/1989 | Morgenstein et al. | 379/211 |
| 4,873,718 | 10/1989 | Barnett et al. | 379/156 |

FOREIGN PATENT DOCUMENTS

| | | | |
|---|---|---|---|
| 8303510 | 10/1983 | European Pat. Off. | |
| 0215309 | 3/1987 | European Pat. Off. | 379/214 |
| 0299784 | 1/1989 | European Pat. Off. | |
| 0041358 | 3/1985 | Japan | 379/142 |
| 0029250 | 2/1986 | Japan | 379/211 |

OTHER PUBLICATIONS

John A. Swart, "ISDN Business Services" IEEE International Conference on Communications '86, Jun. 22-25, 1986.
Aspen's Voice Message Systems PBX Integration Device, Data Sheet, Octel Communications Corporation, 1986, two pages.
Aspen/Branch Voice Message Systems Integrated with the ROLM PBX, Data Sheet, Octel Communications Corporation, 1985, two pages.
Aspen/Branch Voice Message Systems Integrated with the Mitel PBX, Data Sheet, Octel Communications Corporation, 1985, two pages.
ROLM Phonemail Integration for Meridian SL-1 PBX Systems, Programming Announcement, IBM Corporation, Sep. 1987, two pages.
Voice Messaging Integrated with PBX and Centrex, Octel Communications Corporation, Apr. 1988, pp. 1-5.
Rolm's Phonemail—New and Improved, Product Watch, The Yankee Group, Mar. 1987, pp. 1-5.
AUDIX: Audio Information Exchange, AT&T Information Systems, undated, six pages.
Specifications for CINDI III VOICE MAIL, Genesis Electronics Corporation, 1987, six pages.
"Intelligent Network/2: A flexible framework for exchange services", P. Miller, *Bellcore EXCHANGE*, vol. 3, Issue 3, May/Jun. 1987, pp. 9-13.
"Siemens SATURN EPBXs–Systems for Tomorrow's Needs", J. Cottrill et al., *telecom report* (Siemens, Murrock), 10(1987), pp. 278-283.
"VOICESERVER Automated Attendant", brochure, Digital Sound Corporation, 1987, two pages.

Primary Examiner—Thomas W. Brown
Attorney, Agent, or Firm—Blakely, Sokoloff, Taylor & Zafman

[57] ABSTRACT

A voice messaging system for use with a telephone system. The preferred embodiment comprises a voice messaging system which interfaces to a PBX through a feature phone interface, the voice messaging system emulating a feature phone. The PBX supplies information to the voice messaging system such as information on the origination and history of the call. The present invention discloses improved methods of handling calls directed to the voice messaging system based on the information supplied by the PBX.

2 Claims, 11 Drawing Sheets

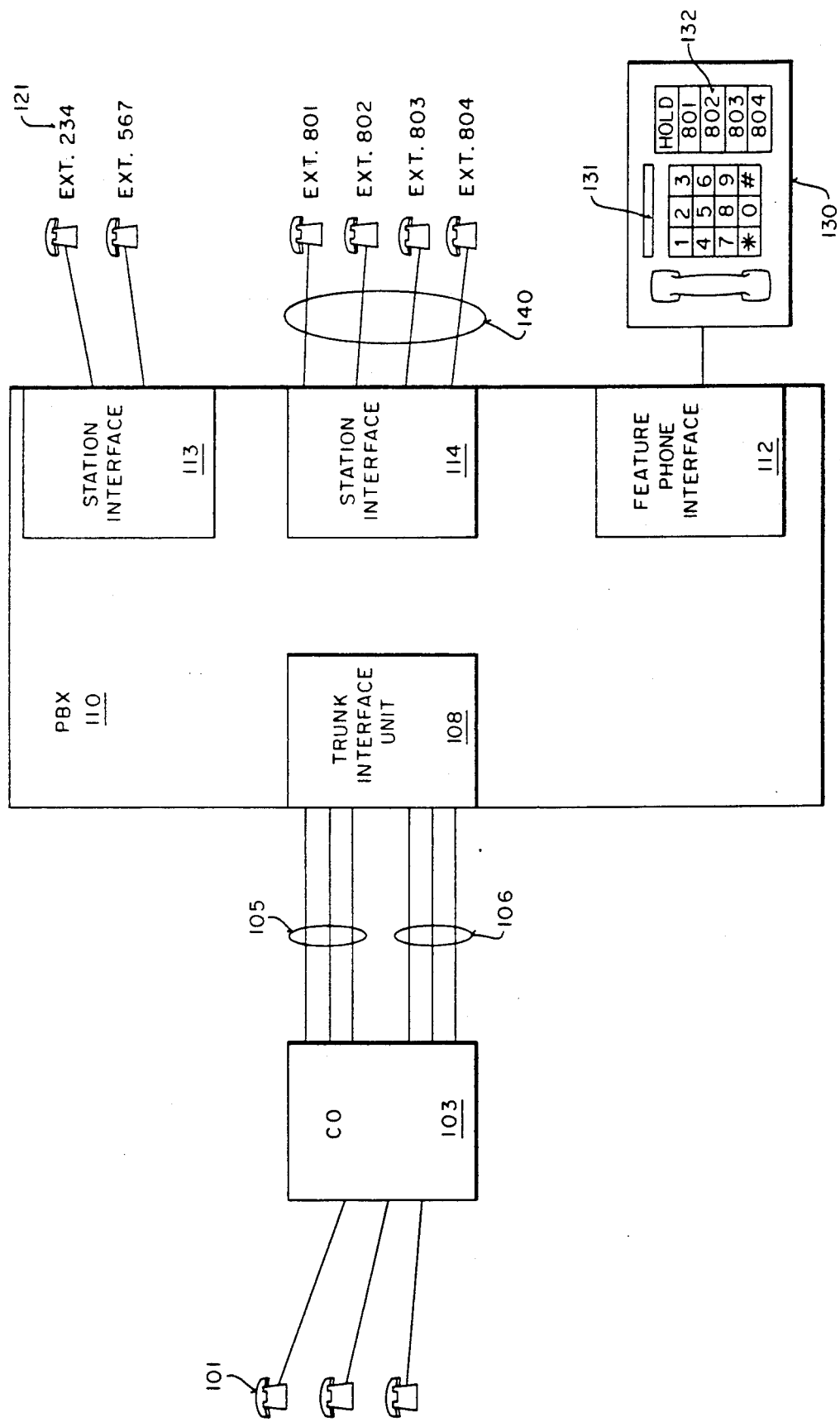
FIG—1 (PRIOR ART)

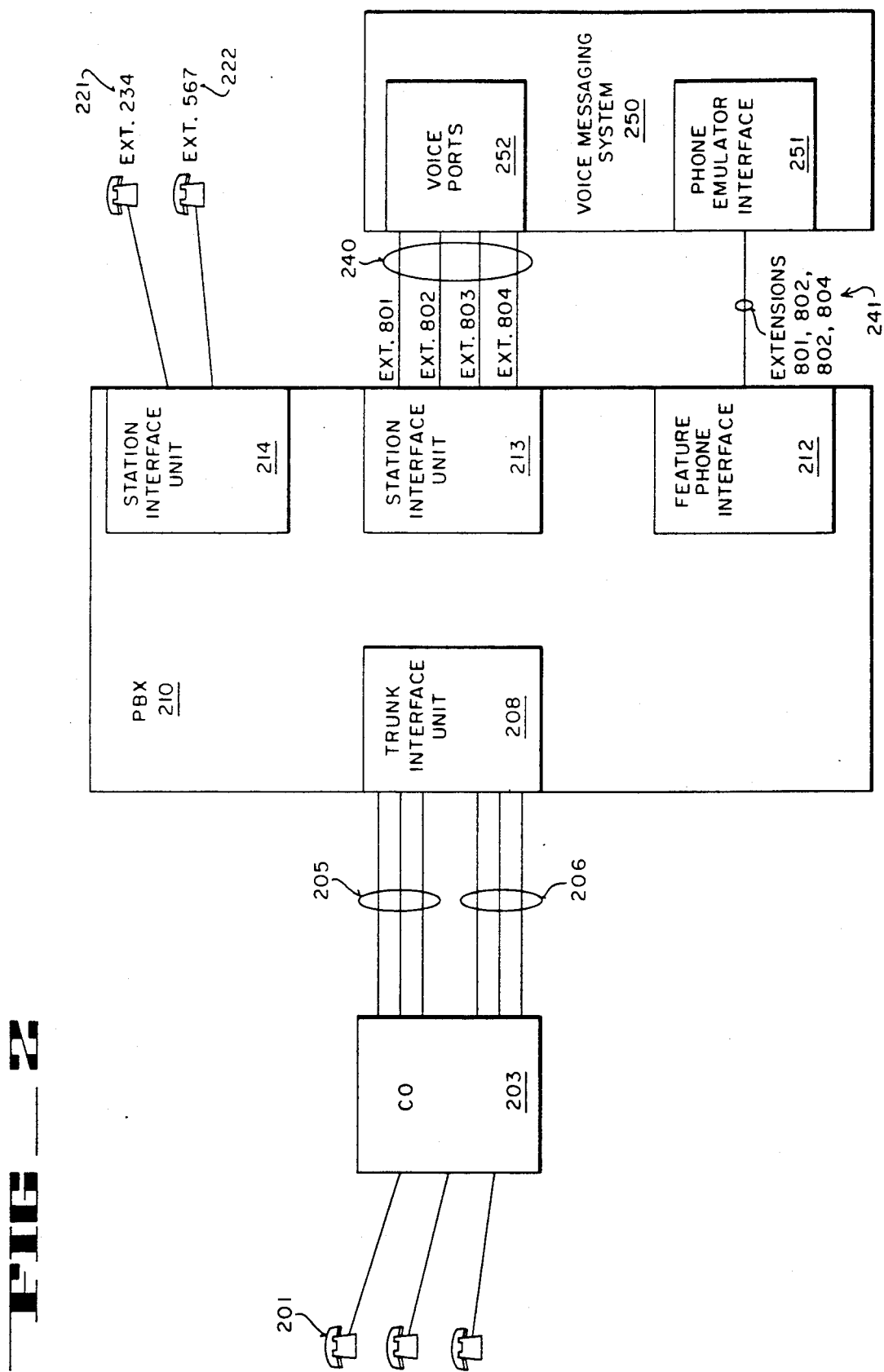

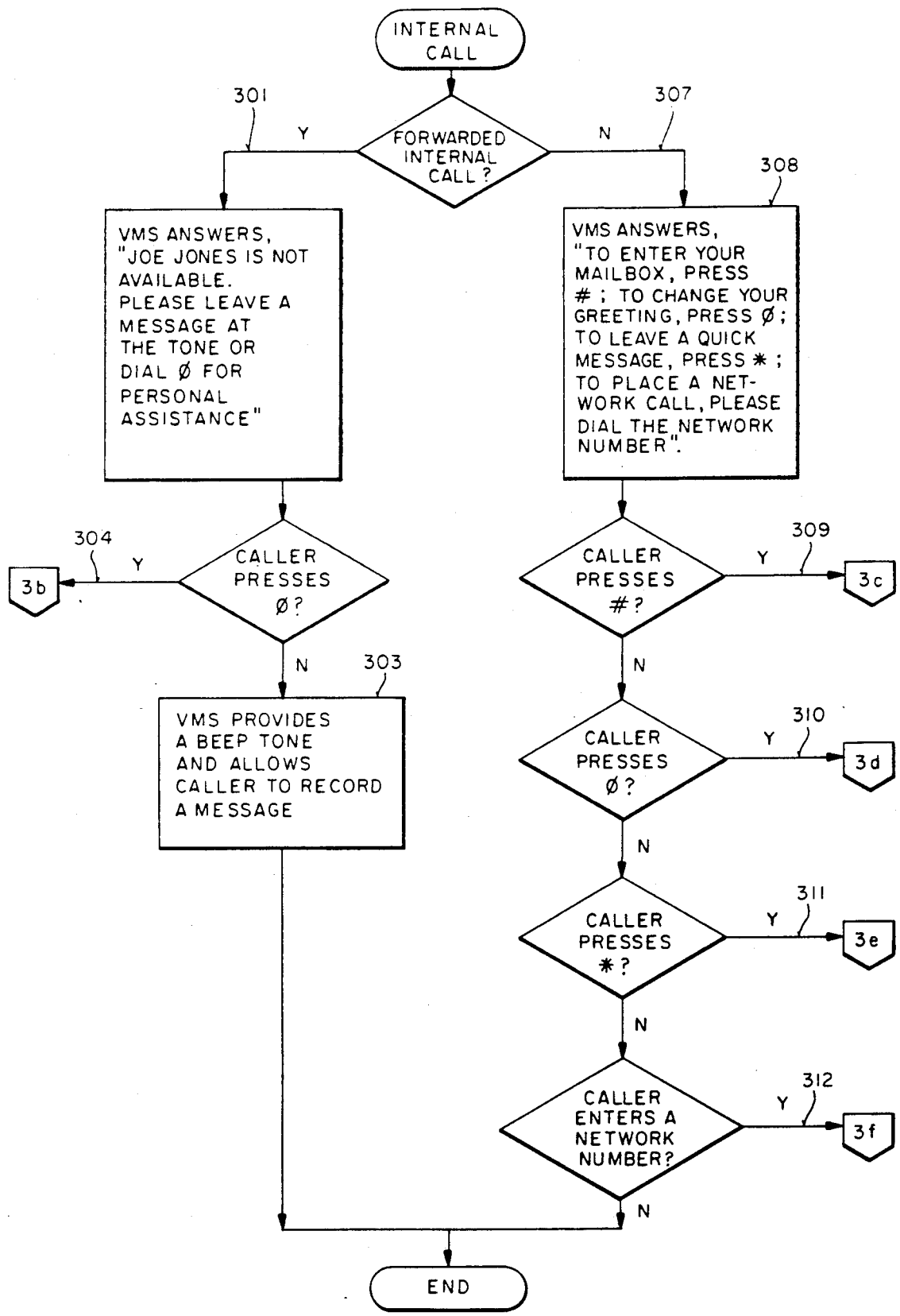

FIG_3B
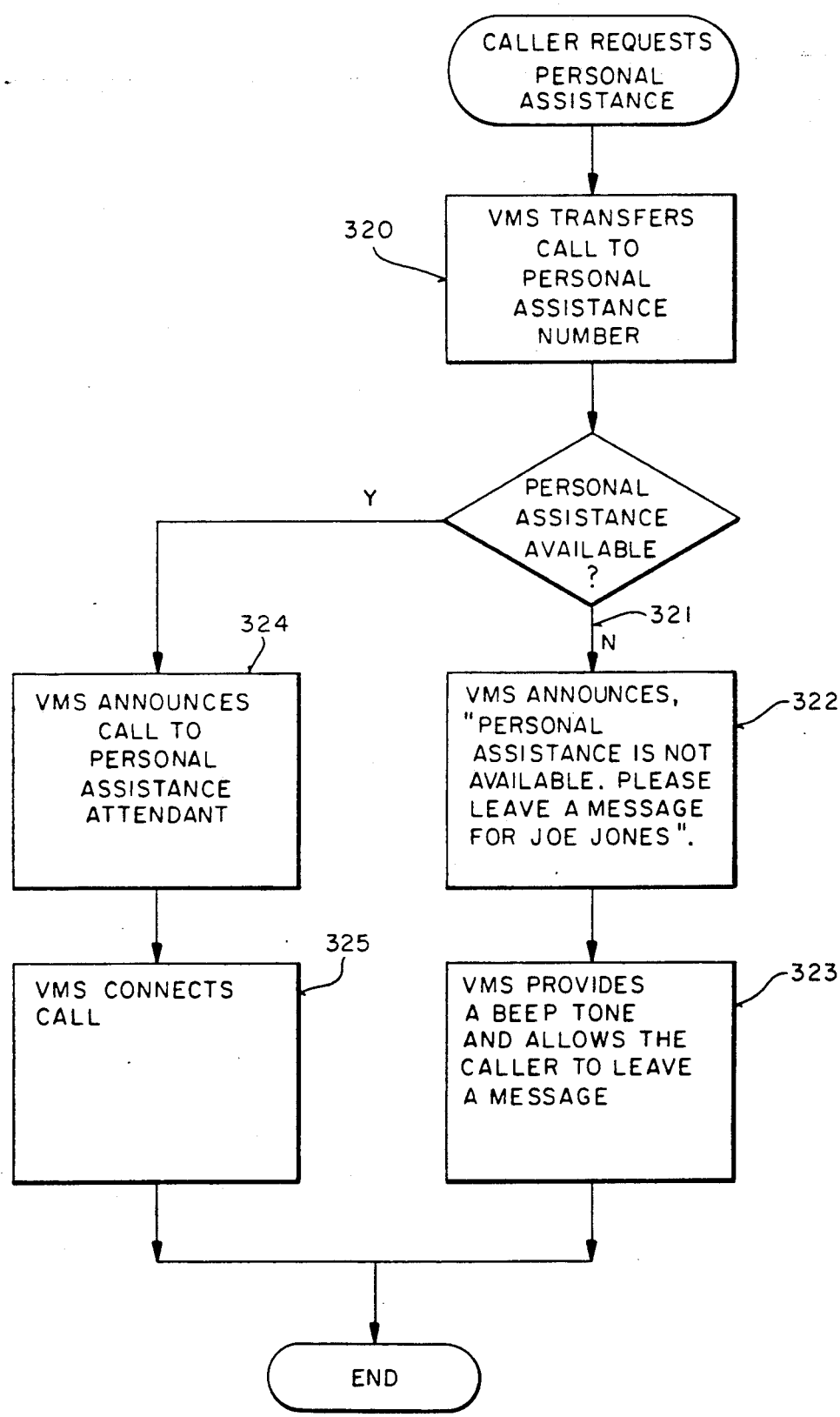

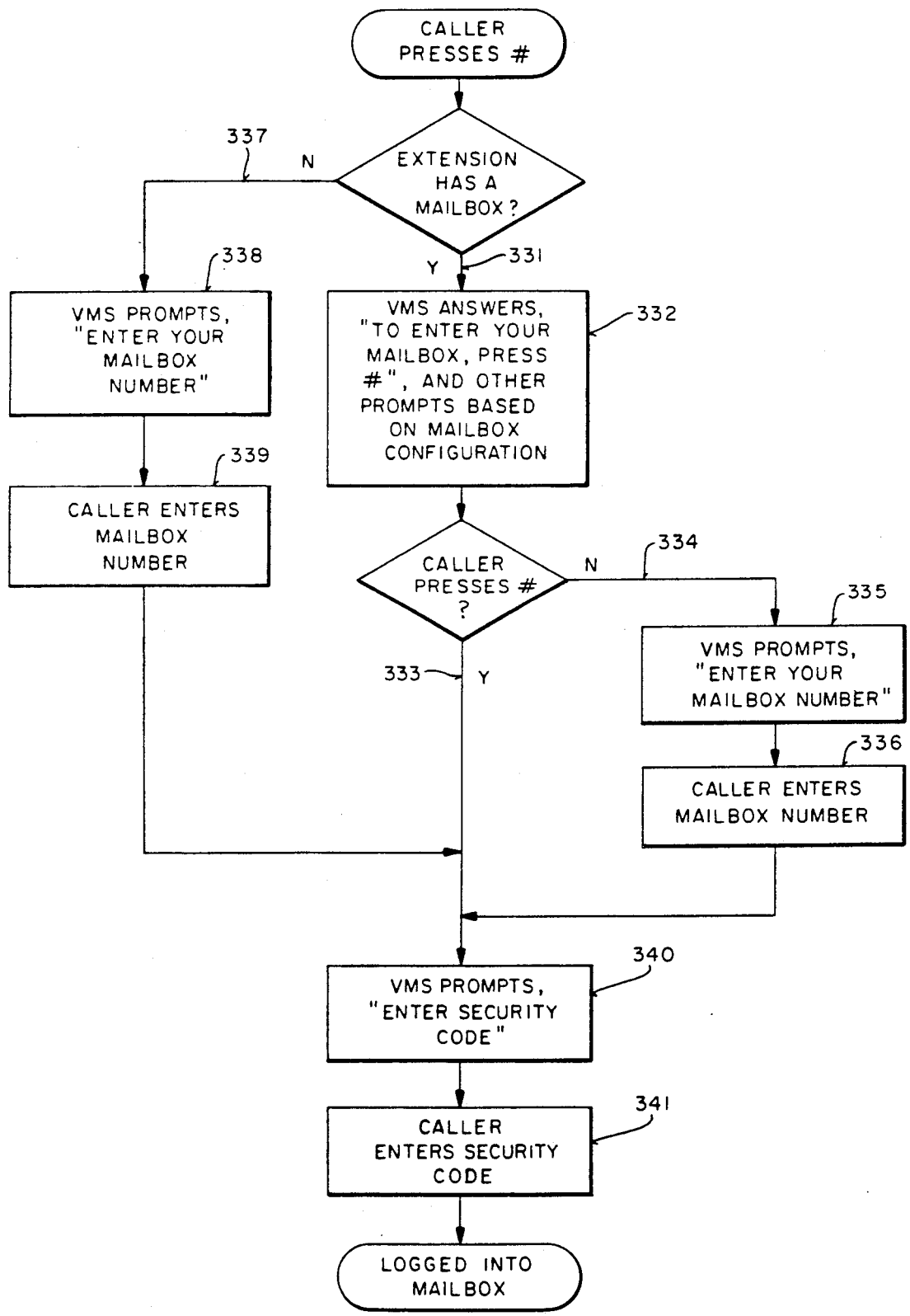
FIG_3C

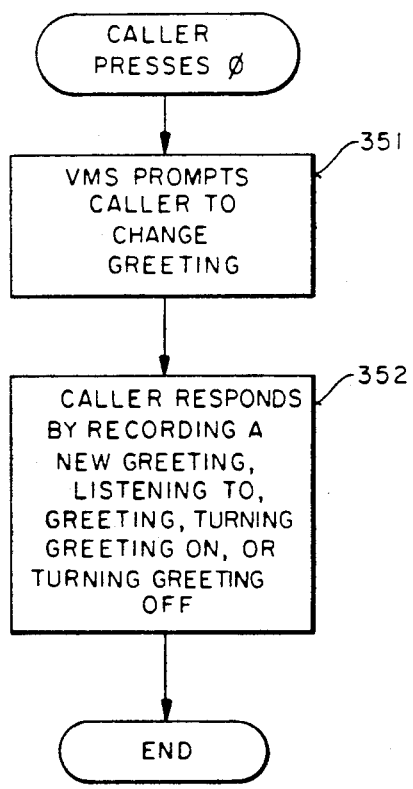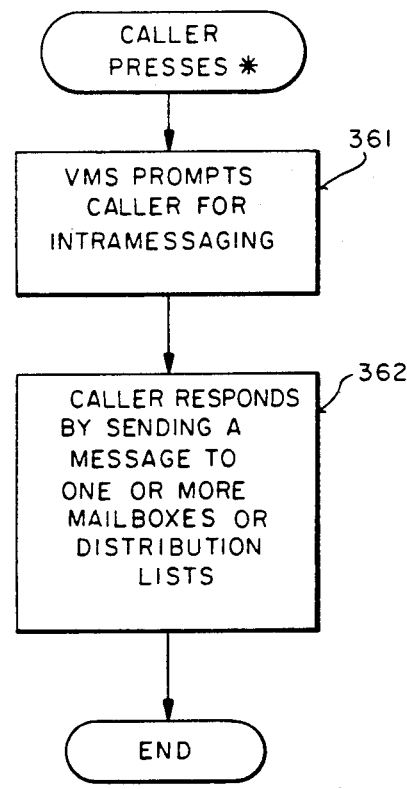

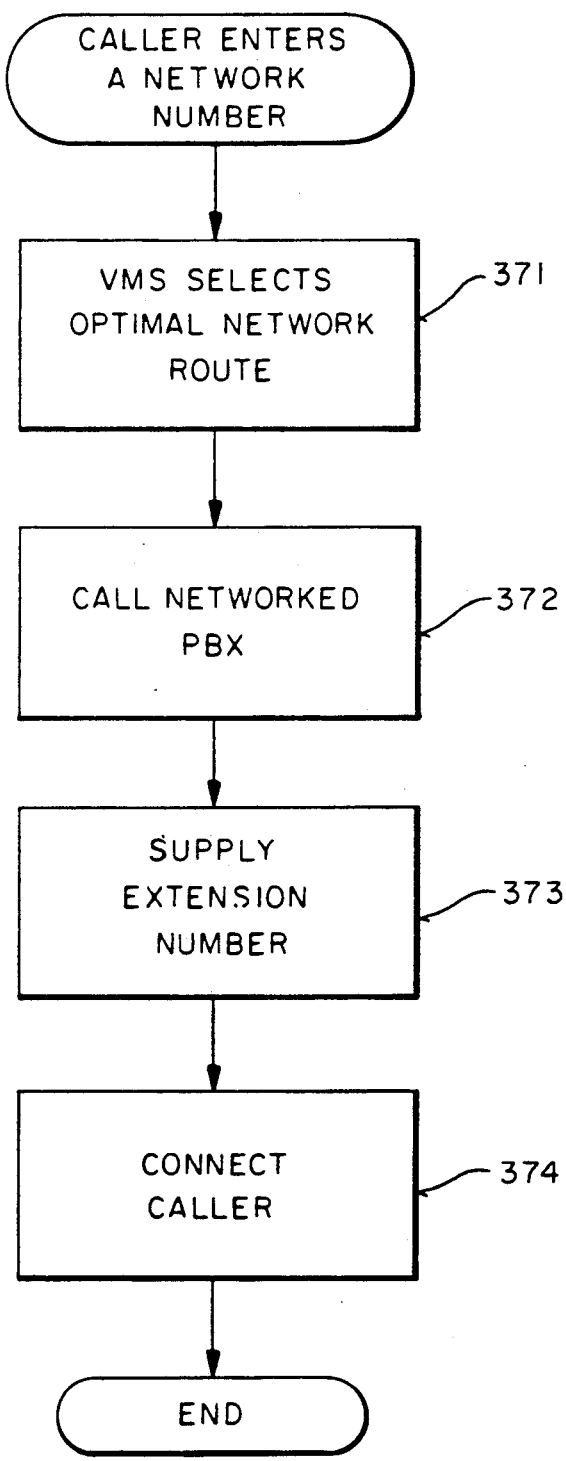
FIG_3F

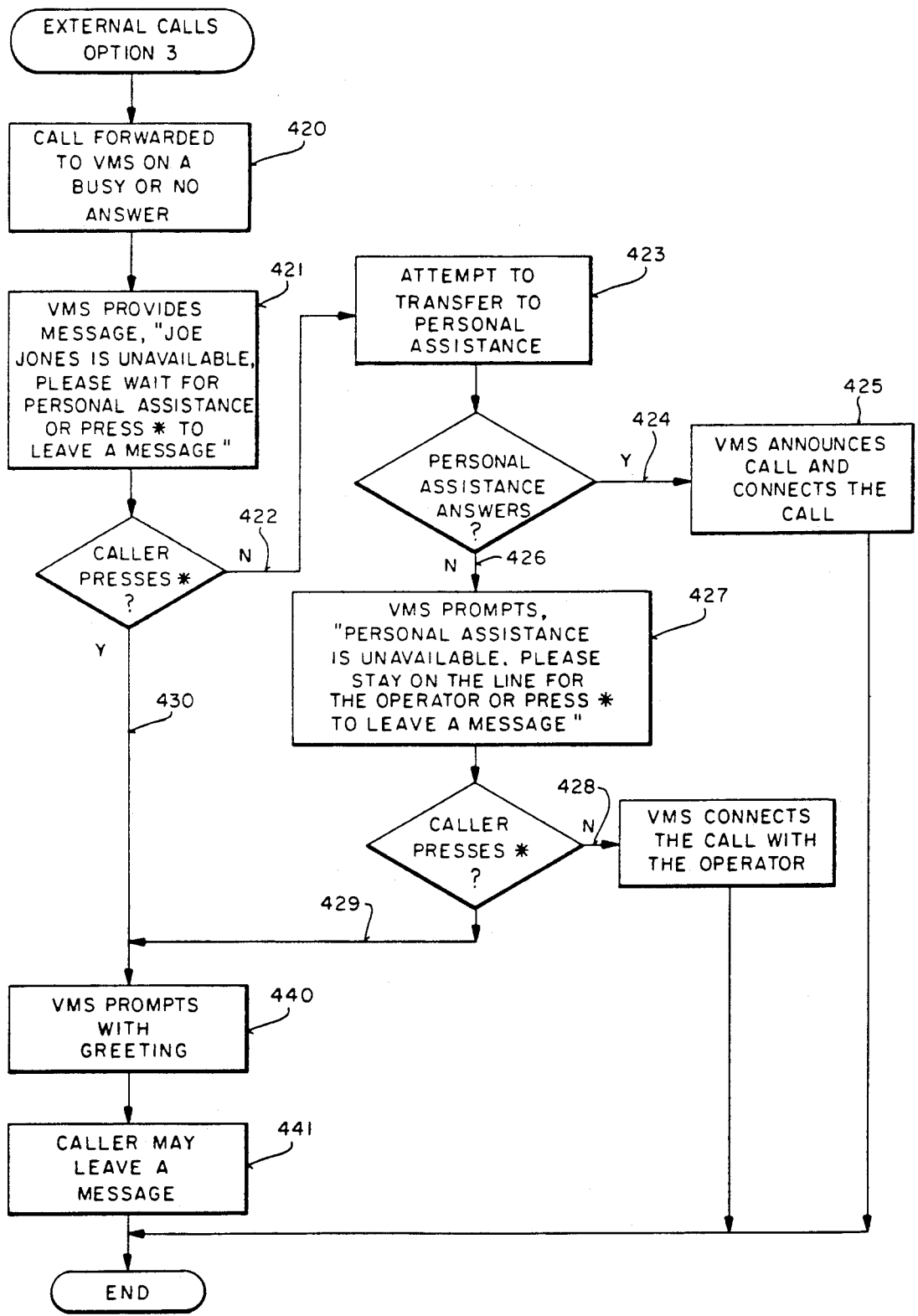

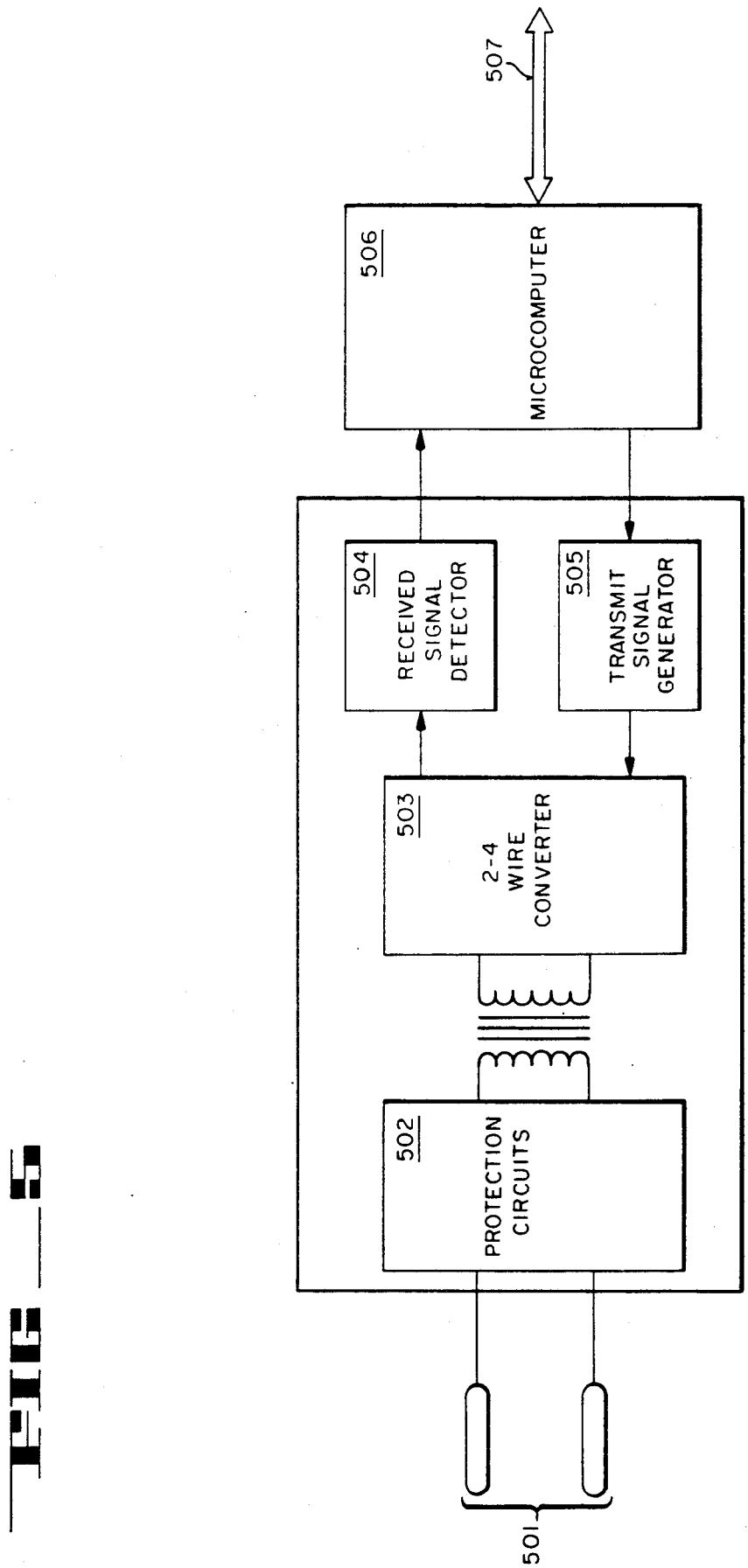

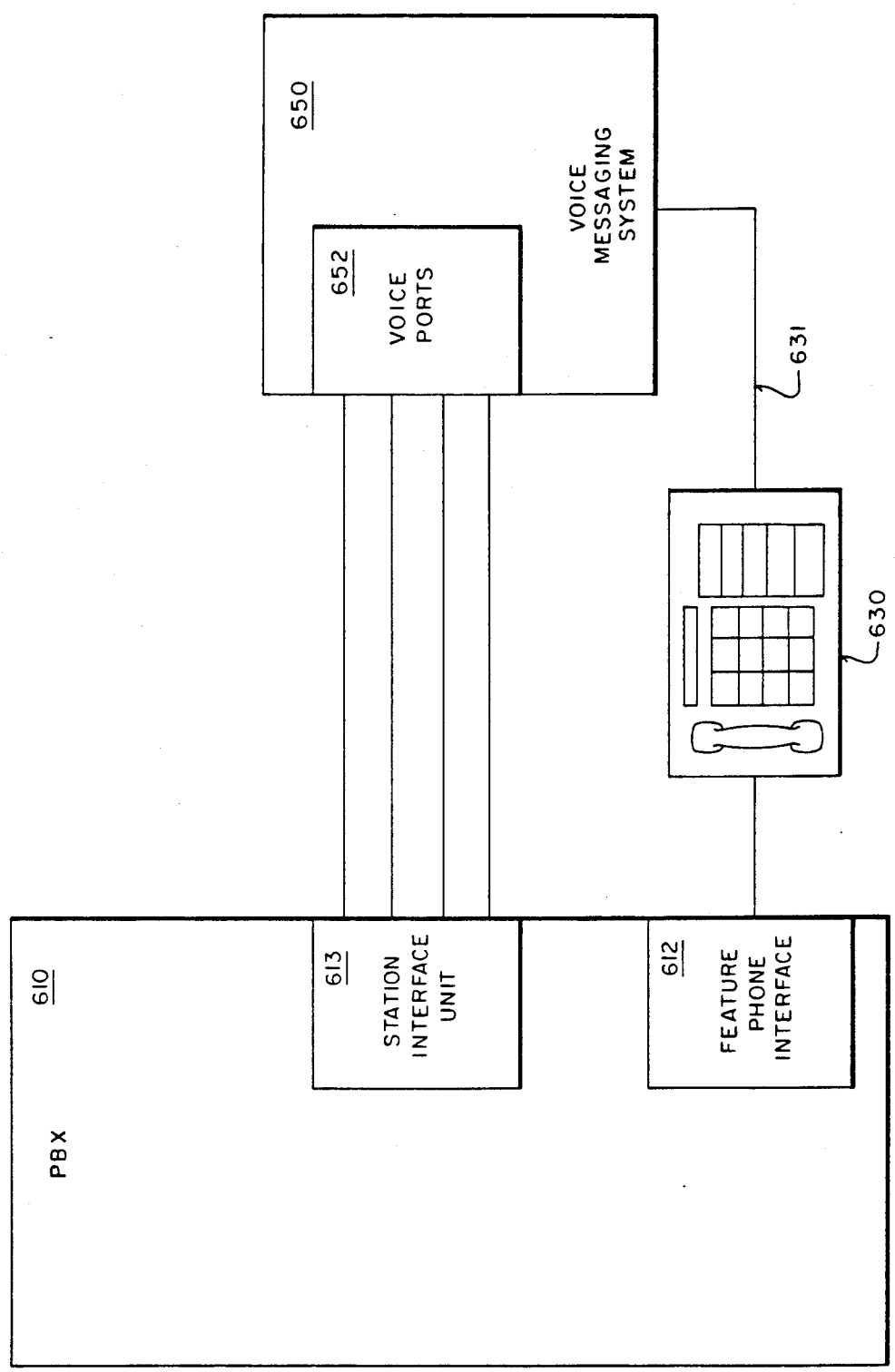

INTERFACE TO AND OPERATION OF A VOICE MESSAGING SYSTEM

This is a continuation of application Ser. No. 07/159,783, filed Feb. 24, 1988, now U.S. Pat. No. 4,926,462.

BACKGROUND OF THE INVENTION

1. Field of the Invention

The present invention relates to field of voice messaging systems for Private Branch Exchange (PBX) telephone systems.

2. Prior Art

A Private Branch Exchange (PBX) may be defined as a telephone exchange system serving an organization, which may be coupled with multiple incoming and outgoing trunk lines and multiple telephone sets at the organization's premises PBX systems provide a variety of functions such as switching of calls from the incoming trunk lines to any of the extensions, switching calls between two extensions and switching calls between extensions and outgoing trunk lines. Numerous PBX systems are well-known and commercially available.

Telephones at the organization's premises may be conventional single line phones (2500 sets) or they may be other, more advanced, telephone sets. For example, a PBX may have provisions for the connection of electronic telephone sets with multiple line capability, display capability, and other advanced features. Such telephones are often referred to as "feature phones". Some PBX systems allow extension numbers which are assigned to individual telephone sets to be assigned also to the multiple line appearances on such a feature phone remote pickup. This capability allows the feature phone to share access to those extension numbers with individual single line telephones.

When an incoming call is directed, by the PBX, to one of those extension numbers, it may be answered by either the feature phone or by the single line telephone set. Often, the PBX provides information about the call to the display of the feature phone. This information may include information regarding the source of the call (a trunk number, a trunk group number, calling party identification information supplied by the telephone network, or a PBX extension number). Further, for calls which have been forwarded to the feature phone from an unanswered extension, additional information is often provided such as the extension number which the call was forwarded from and the reason the call was forwarded (extension was busy, no answer after a predetermined number of rings, extension had been manually forwarded, etc.).

As an alternative to allowing extension numbers assigned to individual telephones to be simultaneously assigned to a feature phone, some known PBX systems allow a single line to utilize a remote pickup feature to gain access to a call to one of the extension numbers assigned to a feature phone.

As an additional feature, some PBX systems provide a facility for allowing a feature phone to receive call information without requiring the feature phone to answer the call.

A number of voice messaging systems are known in the art and are commercially available which may be coupled with a PBX and used to automate the answering of incoming calls from the outside telephone network and the taking of messages when the extensions are not answered by the called parties. Such voice messaging systems incorporate features such as the recording of voice messages for users in what are known as user's "mailboxes". Such voice messaging systems may be accessed by users calling from PBX extensions or from the telephone network over incoming trunks.

In most known voice messaging systems, answering of incoming trunk calls by the voice messaging system is accomplished by instructing the PBX to direct the incoming calls to a group of extensions. Voice ports of the voice messaging system are coupled with this group of extensions and appear to the PBX simply as single line telephone sets. Typically, the voice messaging system will answer a call directed to it and provide a prerecorded voice message asking the caller to enter the extension number he wishes to be connected to. Depending on the specific voice messaging system, there may be other choices given to the caller at this time, such as the option of being transferred to the PBX attendant.

In most known systems, the voice messaging system has no information on the source of the call. Such information would allow the voice messaging system to tailor the handling of the call. For example, it is desired for the voice messaging system to select a specific prerecorded voice message based on the source of the incoming call. Further, it is desired for the voice messaging system to provide tailored caller options based on the source of the incoming call. For the voice messaging system to provide such features, it is necessary to provide the voice messaging system with information on the source of the incoming call including, for example, the trunk number, the trunk group number, or other calling party identification information which may be supplied by the network.

One known method of providing such features is to divide the voice ports of the voice messaging system into groups and to configure the PBX to direct incoming calls from certain trunks or trunk groups to specific groups of voice ports. The voice messaging system may then be tailored to handle calls differently on different voice port groups. Such a method has the disadvantage of requiring a larger number of voice ports then may be required if the voice ports were not grouped. A more efficient use of ports would result if the ports could be pooled in one group and shared for the handling of incoming calls from all trunks.

It is therefore desired to provide a method and apparatus for allowing a voice messaging system to receive information regarding the source of calls which are sent by the PBX to the voice messaging system's voice ports and to allow the voice messaging system to tailor the processing of calls based on such information, cost and compatibility.

In addition to handling calls received by the PBX from incoming telephone trunks, an important function of known voice messaging systems is the handling of calls which do not successfully reach the originally intended extension (the extension was busy, did not answer or had been intentionally placed in a mode in which it was not accepting calls). Such a function may be accomplished in known voice messaging systems by instructing the PBX to forward all such unanswered calls to a group of extensions coupled with the voice ports of the voice messaging system. The voice messaging system may then answer the uncompleted calls and process them. Depending on the specific voice messaging system, the caller may be allowed to leave a voice message, call another extension, or perform some other action.

In the processing of such uncompleted calls by the voice messaging system, it is useful to know the extension number which the caller was originally calling. Such information allows the voice messaging system to provide prerecorded information pertaining to the originally called extension number and allows the voice messaging system to tailor the choices it gives the calling party for further handling of the information. In known voice messaging systems, such a function is often accomplished by providing a prerecorded voice message which prompts the caller with a message such as "You have reached the ABC company message center. please reenter the extension number you were trying to reach". In such a system, if a caller has a touch-tone phone, he may enter the extension number he is attempting to reach, and the voice messaging system may tailor the handling of the call based on the extension number.

There are several problems with this method. First, in many cases, the caller has already dialed the extension number once when the call was originally placed. It is inconvenient to require a caller to reenter the extension number. Second, a caller may be calling from a rotary-dial telephone. In known voice messaging systems, the voice messaging system is unable to receive instructions dialed from a rotary dial telephone. Third, in some cases a caller may not know the extension of the person he was trying to call. Typically, this is the case when a call was initially answered by a PBX attendant and the caller asked to be connected to a specific individual by name.

One known method and apparatus for solving the above problems is to utilize software and an interface apparatus which may be provided by a PBX manufacturer which is intended to provide calling and called party information to a voice messaging or voice messaging system. Such hardware and software is available only from a few PBX manufacturers and often may add significant cost to the telephone switching system.

A second known method and apparatus is utilized by OCTEL COMMUNICATIONS CORPORATION of Milpitas, Calif. in some models of their voice messaging products. As the applicant currently understands the OCTEL system, the feature phone capabilities of many known PBX systems are utilized. The voice messaging system is configured to be coupled with the PBX through a plurality of feature phone ports. The PBX is configured to direct calls, which may be either directly dialed or may be forwarded to one of the plurality of feature phones coupled with the voice messaging system. The voice messaging system may then receive call information regarding a call over one of the feature phone interfaces and may process the call in accordance with the information.

It is desired to develop a system which utilizes the information available from known PBX systems over the feature phone interface without requiring use of a plurality of feature phone ports.

In a third known method and apparatus, a PBX may be programmed to outpulse call history information for a forwarded call to the voice messaging system at the time of the forwarding of a call by using in-band Dual Tone Multifrequency (DTMF) signalling. Such a feature is only available on a limited number of known PBXs.

It is therefore desirable to provide a method and apparatus which allows a voice messaging system to receive information from a PBX regarding the called and calling number when a call is transferred to it and information regarding the reason the call was forwarded.

After the voice messaging system receives information regarding the called and calling number and information regarding the reason the call was forwarded to the voice messaging system, through one of the above-mentioned methods or otherwise, the voice messaging system then processes the call.

Known voice messaging systems do not differentiate such messages based on time-of-day and day-of-week. Further, typical voice messaging systems provide the caller with an opportunity to leave a message for the desired party in a mailbox or to be transferred to another extension for handling of such calls by dialing an extension number. In known systems, the caller is automatically allowed to leave a message in the called party's mailbox but the caller must enter an extension number or provide some other indication if the caller desires to transfer to an alternate extension.

It is an object of the present invention to develop a system which will be more responsive to a caller's needs by allowing the processing of calls to be customized based on the time-of-day, day-of-week, etc.

It is still further an objective of the present invention to provide a system which will allow an extension to be configured to automatically transfer a caller to a second designated extension if the caller does not enter a code for accessing a mailbox when the call is unanswered by the desired extension.

Known voice messaging systems further provide a number of facilities to mailbox users. Such phone systems require users to go through a number of steps to log into the desired mailbox before allowing a caller access to the mailbox facilities. One known voice messaging system manufactured by Rolm Corporation of Santa Clara, Calif. expedites the log in process in some instances by not requiring a mailbox user to enter his/her own extension. However, if a security code has been set on the mailbox then the user must enter security information in order to gain access to any of the mailbox facilities.

It is desired to provide access to certain facilities of a mailbox with a minimum number of steps required of the mailbox user. It is desirable to allow this special access only to certain users of the system and only during certain time-of-day and day-of-week periods.

SUMMARY OF THE PRESENT INVENTION

An improved interface to and improved method of operation of a voice messaging system interface for use with a private branch exchange (PBX) is disclosed. The voice messaging system of the present invention comprises a feature phone emulator interface which may emulate any of several known PBX-compatible feature phones with multiple line capability. The feature phone emulator interface appears to the PBX as an actual feature phone. In the present invention, the PBX is configured to assign a group of extension numbers to line appearances on this feature phone. The extension numbers correspond to single line telephone extensions which are coupled with voice ports of the voice messaging system. The voice messaging system answers all calls to these extensions by using the feature phone emulator interface.

Alternatively, the feature phone may have a unique extension number and the voice messaging system's voice ports may answer calls directed to the feature phone emulator by using the remote pickup feature of some PBXs.

Some PBX systems allow a feature phone to receive call information without answering a call through use of a special function.

The PBX provides commands to the interface which are intended to activate the phone display and provide information regarding the source of the call and. in the case of a forwarded call the reason the call was forwarded to the feature phone. The interface receives these commands and information and provides the information to the voice messaging system control software.

The voice messaging system then goes off hook to receive the call on the appropriate voice port and further processes the call. Depending on the particular PBX, it may be necessary for the feature phone emulator interface to answer the call and place the call on hold prior to the voice port going off hook. In any case. subsequent processing of the call may be performed by the voice port and the feature phone emulator interface is no longer required to take any action until the arrival of a new call.

The availability of call source and original call destination information allows the voice messaging system of the present invention to provide enhanced functionality. For example, calls from specific sources may be assigned special classes of service which may determine how they will be processed. Specific call destinations also may be assigned specific classes of service which determine how calls into those destinations will be processed. The voice messaging system may be instructed to play specific pre-recorded greetings to incoming calls, depending on their class of service. The class of service may be determined by trunk number or trunk group number or other source information made available to the interface.

Forwarded calls which were forwarded from specific extensions or which came in from specific sources may be programmed to be given special handling. For example. the voice messaging system may be instructed to transfer calls to a designated extension after providing a voice message such as "Mr. John Doe does not answer, please hold for personal assistance". As the voice messaging system has been provided with the originally called number through the feature phone emulation interface, the voice messaging system can determine that the name "Mr. John Doe" is to be used and it can be preprogrammed with a specific extension for the call to be transferred to. For example, the call may be transferred to a personal secretary or message center. In the preferred embodiment, the voice messaging system may attempt to transfer the call to this number and will stay on the line to make sure that the transfer takes place successfully. If the personal assistance extension is busy or does not answer, the voice messaging system may then provide a voice message such as "Personal assistance is not available, please hold for the operator" and transfer the call to the PBX attendant.

Other functions and features of the present invention will become apparent from the Detailed Description of the Preferred Embodiment.

BRIEF DESCRIPTION OF THE DRAWINGS

FIG. 1 is a block diagram illustrating a known telephone system.

FIG. 2 is a block diagram illustrating a telephone system as may be utilized by the preferred embodiment.

FIGS. 3A through 3F are flowcharts illustrating a method of handling internal calls as may be utilized by the preferred embodiment.

FIGS. 4A through 4D are flowcharts illustrating a method of handling external calls as may be utilized by the preferred embodiment.

FIG. 5 is a block diagram illustrating circuitry of a feature phone emulation circuit as may be utilized by the present invention.

FIG. 6 is a block diagram illustrating use of a feature phone comprising an interface jack for coupling with a voice messaging system as may be utilized by the present invention.

DETAILED DESCRIPTION OF THE PRESENT INVENTION

Figure 4A:
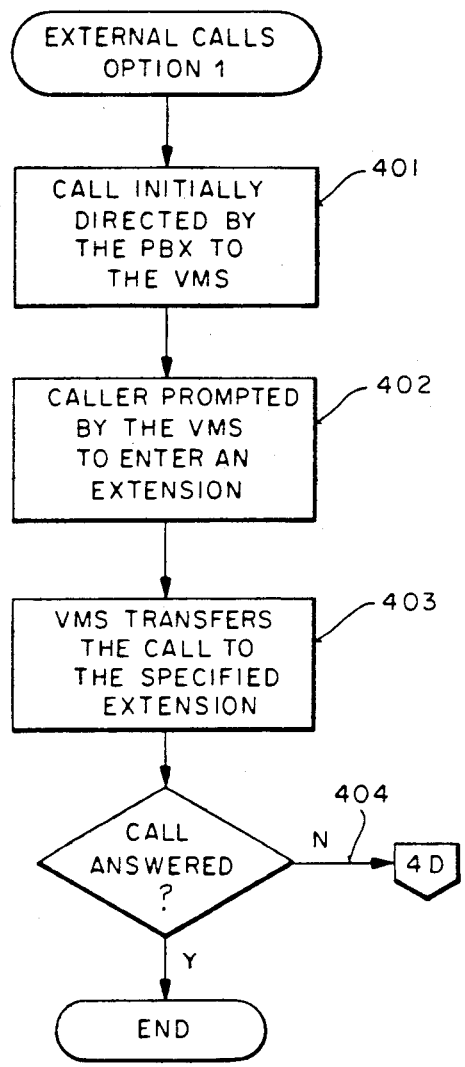

A telephone system. including a voice messaging system is described. In the following description, numerous specific details are set forth such as specific prompts and menus. specific codes. etc. in order to provide a thorough understanding of the present invention. It will be obvious. however, to one of ordinary skill in the art that the present invention may be practiced without these specific details. In other instances, well-known circuits, structures and techniques have not been shown in detail in order not to unnecessarily obscure the present invention.

The present invention discloses an improved interface to and method of operation of a voice messaging system (VMS) in which the voice messaging system is able to receive information from a telephone switching system and utilize such information to provide advanced call processing and voice messaging features.

Although the following description makes specific reference to PBX systems, the present invention anticipates the use of the disclosed voice messaging system with other telephone switching systems such as a key system, Centrex system or hybrid system. Further, the methods for processing calls described herein may be practiced in a telephone system utilizing an external voice messaging system or may be equally practiced in a telephone switching system which provides the features of a voice messaging system as an integral function of the switching system. The methods for processing calls described herein may be applied in a variety of phone systems in which the required call information may be obtained either through the methods and apparatus detailed herein or through other methods and apparatus. It will be appreciated that the methods of processing calls are not intended to be limited to use of the disclosed methods and apparatus for obtaining call information, except as specifically provided in the claims.

Known voice messaging systems allow callers to dial extensions, access online directories, leave voice messages, and dial new extensions without interfacing with a human attendant. However, such systems either are not capable of processing calls in the fashion offered by the present invention because they lack information when receiving calls such as the nature of the call, the reason the call was forwarded to the voice messaging system, etc., or in order to process calls, they must be specially configured for a specific PBX and connected to the PBX through special PBX voice messaging system ports provided by the PBX vendor as part of a PBX/voice messaging system integration feature. This type of feature is often expensive and often does not provide all the call information which may be useful to the voice messaging system.

Referring now to FIG. 1, in the prior art it is known to supply a PBX 110 with a feature phone interface 112. In such a system, outside callers may place calls from any phone 101 to the PBX, such calls being routed through a central office 103 and onto trunk lines 105 and 106 which couple the central office 103 with a trunk interface unit 108 of the PBX 110. For example, trunk group 105 may be for incoming calls from a WATS line or similar number used for allowing customers of a company to call in to place orders for products. Trunk group 106 may be for calls coming in on a general office number utilized for administrative and other functions.

In such a phone system, a call may be transferred by the console operator to a particular extension, for example extension 234, 121. The PBX may be designed to forward a call transferred to extension 234 to a message center on extensions 801 through 804, 140 if a call to extension 234 is either unanswered or if extension 234 is busy. The message center attendant may answer the forwarded call on a feature phone 130, which has line appearances 801 through 804 on its line buttons, 132.

A feature phone interface 112 provides information to the feature phone 130 which is displayed on the display 131 and by lighting line buttons 132. For example, the display may state that the call has been transferred to extension 802 because extension 234 is busy when button 802 is depressed. Thus, the call is able to be answered, with the person answering the call knowing the extension 234 was not answered because the phone was busy, and thus, the person answering may be more helpful to the caller as a result.

Referring now to FIG. 2, phones 201 refer to phones of the same type as phones 101 of FIG. 1, central office 203 refers to a central office of the same type as central office 103 of FIG. 1, trunk groups 205 and 206 refer to trunk groups of similar types to trunk groups 105 and 106 of FIG. 1. PBX 210 refers to a PBX of similar type to PBX 110 of FIG. 1, and trunk interface unit 208 refers to a trunk interface unit of similar type to trunk interface unit of 108 of FIG. 1.

The preferred embodiment of the present invention comprises a voice messaging system 250 which emulates a PBX-compatible feature phone with multiple line capability. To the PBX 210 the voice messaging system 250 appears to be an actual feature phone and a set of single line phones. A phone emulator interface 251 is designed to emulate the feature phone 130 of FIG. 1.

Referring briefly to FIG. 5, a feature phone emulator interface 251 of FIG. 2 is more fully described. A data link 501 is provided for coupling the emulator interface 251 with a feature phone interface 212 on a PBX. In one embodiment of the present invention, the data link 501 comprises an RJ-11 type jack. However, it will be obvious to one of ordinary skill that many alternate data link means may be utilized and the particular data link is typically dictated by the PBX manufacturer.

The data link 501 is normally coupled with ordinary protection circuits 502 for protecting circuits in the phone system from electrical variations. Signals from the data link 501 are electrically coupled with received signal detector circuitry 504 which converts the analog data link signal to digital signals through a two-to-four wire converter 503. Signals output from the voice messaging system are converted from digital form to analog by transmit signal generator 505. Transmit signal generator 505 is electrically coupled with data link 501 through two-to-four wire converter 503 and protection circuits 502.

The protection circuitry 502, two-to-four wire converter 503, received signal detector 504 and transmit signal detector 505 comprises circuitry similar to that found in actual feature phones. The details and specifications of the particular circuitry may vary from PBX manufacturer to PBX manufacturer.

A microcomputer 506 is coupled with the received signal detector 504 to receive digital signals from the PBX. The digital signals comprise display and other information for a feature phone which may be utilized by the voice messaging system of the present invention. The microcomputer 506 is further coupled with the transmit signal generator 505 for providing signals from the voice messaging system to the PBX. Finally, the microcomputer 506 is coupled with the voice messaging system bus 507 for providing a communication link with the remaining voice messaging system circuitry.

Referring again to FIG. 2, utilizing such a phone emulator interface 251, the voice messaging system 250 is provided with information on the origin of a call and the reason the voice messaging system 250 is receiving the call when a call is transferred to the voice messaging system 250.

The PBX is programmed to assign a group of extension numbers 241 to line appearances coupled with the phone emulator interface 251. These extension numbers 241 correspond with voice port lines 240 coupled with voice ports 252 of the voice messaging system 250. The voice messaging system 250 sees calls ringing on extensions 241 by using the phone emulator interface 251. The PBX 210 provides commands to the interface which are intended to activate the phone display, such as that shown in FIG. 1, 131, and provides information on the source and forwarding information of the call. The phone emulator interface 251 receives these commands and provides this information to the control software of the voice messaging system.

As previously discussed, in the preferred embodiment the phone emulator interface 251 is custom-designed to work with a particular PBX. This is necessary because the commands and information from the PBX are not supplied in a standard manner from manufacturer to manufacturer or from product line to product line. For example, depending on the particular PBX, the feature phone emulator interface 251 may either receive call information by answering the call or may receive the call information without need for answering the call through use of a special feature. In Northern Telecom's SL/1 PBX, a feature phone may accept call information by an operator depressing a "DISPLAY" button. In certain AT&T PBX's, a feature phone may accept call information by an operator depressing an "INSPECT" button. In both instances, depressing the specialized button has the effect of allowing the feature phone to receive call information without answering the call.

In any event, after the voice messaging system 250 receives the call information, the voice messaging system 250 then goes off-hook on the appropriate voice port 252 and processes the call as will be described in more detail below. Depending on the particular installation, it may be necessary for the interface 251 to place a call on hold prior to the port 252 going off-hook and taking over processing of the call. Another alternative embodiment allows one of the ports 252 to be conferenced into the call. After a port 252 is conferenced in, the voice messaging system may hang-up on port 251. In any case, subsequent processing of the call may be performed by the port and the interface 251 will not take any action on that line appearance until the port is finished processing the call, the call drops from the extension, and a new call arrives at that extension. While the port is processing the call, calls arriving on other extensions may be answered by the interface 251 and be processed in a similar manner.

As alternatives to the voice messaging system 250 going off hook on the appropriate voice port 252 and processing the call, certain installations may utilize either a remote pickup feature or a conferencing feature of some PBX's.

When utilizing the remote pickup feature, the voice messaging system 250 first receives call information through the phone emulator interface 251 without answering the call, using a means such as the "DISPLAY" feature of Northern Telecom's SL/1 or the "INSPECT" feature of certain AT&T systems. The voice messaging system may then instruct the appropriate voice port 240 to receive the call using a conventional remote pickup feature of many known PBXs.

When utilizing the conferencing method, the voice messaging system 250 first answers the call through the phone emulator interface 251 and receives call information. The appropriate voice port 240 may then be conferenced into the call utilizing conventional conferencing features of many known PBX systems and the feature phone interface 251 may then be disconnected from the call.

Another alternative to the preferred embodiment may be described with reference to FIG. 6. Certain manufacturers' PBX's may be configured with a feature phone 630 with a data link 631 for supplying call information. In such a system, the data link 631 may be coupled with a voice messaging system 650 for supplying call information such as the call information supplied through the phone emulator interface 251 of FIG. 2. The feature phone 630 may be coupled with a PBX 610 through a feature phone interface 612 using conventional means.

Voice ports 652 are coupled with the PBX 610 through a station interface unit 613. In this embodiment, the voice ports 652 need not share extension numbers with the feature phone 630. When the voice messaging system 650 receives call information over data link 631, it may instruct the PBX 610 to direct the call to one of the plurality of voice ports 652. This may be done through use of the remote pick-up facility of many known PBX systems as described above. Specifically, a remote pick-up code may be transmitted over the voice ports 652 to be received at the PBX and the PBX directs the call to the voice port which transmitted the remote pick-up code in response to the transmittal of the remote pick-up code. Alternatively, various call transfer features are available in PBX's and these transfer features may be invoked by the voice messaging system through the feature phone port 631 to transfer the call to one of the voice ports 652.

INTERNAL CALLS

FIGS. 3A through 3F illustrate features of the preferred embodiment of the present invention when processing a call which originated internal to the local PBX (e.g., a phone set coupled with the local PBX calling another phone extension coupled with the same PBX).

If the voice messaging system receives a call which is forwarded from another extension, branch 301, the voice messaging system will respond with a message such as "Joe Jones is not available. Please leave a message at the tone or dial 0 for personal assistance", block 302.

In the preferred embodiment, a user may customize the introductory message with a personal greeting. For example, the user may replace "Joe Jones is not available" with "Hello, this is Joe Jones. I am on vacation until December 15th and will not be checking messages until that time".

The caller may then wait for a beep tone indicating a voice message may be recorded. The caller may leave a message after the beep tone, block 303.

One feature of the preferred embodiment allows the caller to depress the * (asterisk) key during the prompt message. If the caller enters an asterisk, the voice messaging system will skip the remainder of the prompt message and proceed directly to a beep tone after which the caller may leave a message. The preferred embodiment further allows a caller to depress keys during any prompt to enter commands to the voice messaging system and, thus, increase the speed of processing a call.

Alternatively, the caller may depress the 0 (zero) key. As illustrated by FIG. 3B, the voice messaging system transfers the call to a personal assistant number. In the preferred embodiment, each person having a phone extension in the PBX may have a mailbox associated with the extension. The mailbox can be configured with a number of options.

One inventive feature of the present invention allows the mailbox to be configured with a personal assistant extension. For example, the president of the company may use as his personal assistant extension the extension of his personal secretary. Since the voice messaging system has been provided with information indicating the original destination of the call, e.g. the call was originally destined for the president's phone, the voice messaging system may obtain from the appropriate mailbox the personal assistant extension for the desired extension and handle the call as described below.

The voice messaging system initiates a transfer of the call to the personal assistance extension by momentarily interrupting the PBX's loop current on the voice messaging system's voice port. This is often referred to as a hookswitch flash since it is processed by the PBX essentially the same as processing a manual transfer of a call initiated by a live person momentarily depressing the hookswitch of a telephone. The voice messaging system outpulses the personal assistance extension number to the PBX preceded by any required PBX transfer codes.

The voice messaging system monitors the line to ensure that a call is answered by the personal assistant. If the call is unanswered after a predetermined number of rings or if the personal assistance extension is busy, branch 321, the voice messaging system performs another hookswitch flash and outpulses any required reconnect codes to reconnect the caller and announces to the caller "Personal assistance is not available. Please leave a message for Joe Jones.", block 322. The voice messaging system provides a beep tone and allows the caller to leave a voice message in the mailbox of the person being called, block 323.

If the voice messaging system detects that personal assistance is available, i.e. the phone is answered, the voice messaging system announces the call to the personal assistance attendant, block 324. For example, the voice messaging system may announce to the attendant "Connecting forwarded call, Joe Jones is unavailable". As the voice messaging system has been supplied with information such as whether Joe Jones' line is busy, unanswered or placed in a mode in which it is not accepting calls, the voice messaging system is able to supply such information to the attendant. The attendant is then more intelligently and efficiently able to handle the call.

The voice messaging system connects the call after the announcement, block 325. One feature of the preferred embodiment allows the voice messaging system to monitor the personal assistance extension and provide the announcement to the personal attendant while preventing the caller from hearing ringing tone and from hearing the announcement. The caller is connected to the personal assistance extension by the voice messaging system hanging up after the announcement is made to the attendant.

The personal assistance feature may be configured to be available only during certain hours (e.g. normal business hours) and unavailable at other times (e.g. nights, weekends, holidays). Further, a mailbox user may turn the personal assistance feature on or off as configured option in his/her mailbox at any time. In addition, a personal assistance attendant may configure his/her mailbox to indicate the extension is not available to receive transferred calls.

Referring again to FIG. 3A, if the internal call is not a forwarded call, branch 307, the voice messaging system will assume the caller is attempting to log into his or her mailbox. The preferred embodiment of the present invention allows for several inventive features which make accessing a mailbox to change greetings, leave messages and make network calls more simplified than known prior art systems.

The use of information supplied from the feature phone interface, as discussed above, allows the voice messaging system to process calls of users logging into their mailboxes more efficiently. For example, since the voice messaging system is supplied with the extension number being called from, it may not be necessary for the user to enter his mailbox (extension) number to access his mailbox. This same information allows the voice messaging system to let the user carry out certain common functions without the need to complete the process of logging into the mailbox. For example, changing personal greetings is a common function. In the preferred embodiment, as will be shown in more detail below, a user is able to change his/her personal greeting without completing the process of logging into the mailbox.

When the voice messaging system receives a call from a user attempting to log into his/her mailbox, it responds with a message such as "To enter your mailbox, press #. To change your personal greeting, press zero. To leave a quick message, press asterisk. To place a network call, please dial the network extension number.", block 308. If the user is familiar with this menu, he/she may depress the pound sign, zero, asterisk or network number at any time during the message.

If the user depresses the pound sign, branch 309, to indicate he/she wishes to enter his/her mailbox, the voice messaging system proceeds as illustrated by FIG. 3C. First, the voice messaging system determines whether the extension being called from has a mailbox. If it does, branch 331, the voice messaging system responds with a menu based on the mailbox configuration for the extension being called from and the configuration of the PBX/voice messaging system. In the preferred embodiment, the menu will always begin with a prompt such as "To enter your mailbox, press pound sign", block 332.

A class of service code associated with the mailbox determines whether the personal greeting may be changed without logging in. If it may be changed, a prompt such as "To change a greeting, press zero" is given as part of the menu. Referring briefly to FIG. 3D, if the user depresses zero branch 310, he/she is prompted to change the personal greeting associated with the mailbox, block 351. The user may then record a new greeting, listen to the current greeting, turn the greeting on or turn the greeting off, block 352. This and other features of the present invention may be enabled or disabled based on time-of-day, day-of-week, holiday, etc. In particular, by disabling this feature during non-business hours, unauthorized changes to the personal greeting may be prevented.

Certain configurations of the preferred embodiment allow for users of the voice messaging system to send messages to other user's mailboxes and have the messages tagged with the originator's mailbox address. This feature allows the receiver to reply to the message without looking up the originator's mailbox address or to immediately place a call to the originator of the message without knowing the originator's extension. Further, by tagging the message with the originator's mailbox address, the originator may request notification of the receiver having listened to the message.

According to one feature of the present invention, a system configured with such an intra-messaging feature may have a prompt such as a "To leave a quick message, press asterisk". If the user depresses the asterisk key, branch 311, then, referring to FIG. 3E, he/she is prompted for a mailbox address to send a message to, block 361. The user is then allowed to record a voice message, block 362. The message is sent to the designated mailbox and tagged with the mailbox address of the sender, allowing use of the features of intra-messaging without logging into the user's mailbox.

The preferred embodiment may be configured to network a plurality of voice messaging systems and their associated PBX's together. For example, in a company with multiple plant sites located in geographically separate areas, each site may have its own PBX and voice messaging system. It is desired to allow a caller at one of these plant sites to call an extension at another plant site letting the voice messaging system select the optimal network route and place the call. The caller may be calling a person's extension at the other plant site or a mailbox extension. According to another feature of the present invention, when a plurality of voice messaging systems are networked together, the system may prompt with a message such as "To place a network call, please dial the network number" as part of the menu. The user may then enter a network extension number, branch 312.

Referring briefly to FIG. 3F, the voice messaging system selects an optimal network route for placing the network call, block 371. The voice messaging system then calls the networked PBX over the optimal route, block 372 and supplies the extension number to the networked voice messaging system in response to a prompt, block 373. The voice messaging system then connects the caller, block 374.

The voice messaging system utilizes a method similar to the method described previously in conjunction with transfers to personal assistance extensions to transfer the caller to the networked PBX. That is, the voice messaging system initiates transfer of the call by performing a hookswitch flash and outpulsing the networked PBX's phone number to the PBX. After the call is answered by the networked PBX and a prompt is provided by the networked voice messaging system requesting an extension, the voice messaging system provides the desired extension and hangs up to connect the caller with the desired network extension number.

Referring again to FIG. 3C, if the caller enters a pound sign in response to the menu prompts, branch 333, the voice messaging system will wait a predetermined amount of time. The user may enter a second pound sign during this period of time which indicates he wishes to log into the mailbox identified by the calling extension. Alternatively, if the user does not enter a second pound sign, branch 334, the voice messaging system will prompt with a message such as "Enter your mailbox number", block 335. This feature allows, for example, a secretary to pickup a manager's messages from the secretary's phone or allows a mailbox user to pick up messages from an extension other than his/her own. The user will enter his/her mailbox number, block 336.

If the extension being called from does not have a mailbox associated with it, branch 337, the voice messaging system will prompt with a message such as "Enter your mailbox number", block 338, and the user may then enter his/her mailbox number, block 339.

In any event, the voice messaging system has been provided with the mailbox number which the user desires to log into. The voice messaging system then prompts with a message such as "Enter security code" if a security code has been specified for the mailbox, block 340. The user may enter the security code, block 341 and is logged into the mailbox.

Once logged into the mailbox, the user may perform a number of conventional functions such as listening to messages, sending messages, changing personal greetings, changing security codes, etc. Further, as an inventive feature of the present invention, when logged into a mailbox, a user may specify the personal assistant extension associated with the mailbox.

The above options, by allowing a user to quickly perform certain functions before or during logging into his/her mailbox, make the system responsive to the user's specific needs.

EXTERNAL CALLS

The voice messaging system is able to handle externally generated calls as well as internally generated calls.

The present invention is able to select a unique initial greeting based on an incoming trunk number or trunk group and able to provide flexible menus to support different classes of incoming calls which have not yet been transferred to specific extensions. For example, referring again to FIG. 2, trunk group 205 may be a group of incoming WATS lines for accepting calls from customers for various types of customer support. The voice messaging system may be instructed to answer all calls coming in on trunk group 205 with a message such as "You have reached ABC company. Please dial 1 to place a sales order, please dial 2 for information regarding ABC's products, please dial 3 for information concerning scheduled ship dates for current orders or stay on the line for further assistance". The voice messaging system is able to provide this message because it has been informed through the feature phone interface 212 and phone emulator interface 251 that the call is an incoming call on trunk group 205. The user may then enter 1, 2 or 3 and receive the desired assistance or stay on the line to be forwarded to a predetermined extension for handling.

The selection of a particular message or menu for incoming calls may be made depending on either a trunk number or trunk group and also may be customized depending on the time of day and day of week.

There are three methods utilized for handling unanswered external calls, the preferred method determined by the origination of the call and the extension being called. The voice messaging system is provided with information regarding the origin of the call and the extension being called through the feature phone interface. This information allows the voice messaging system to determine the particular method of handling the unanswered call.

The first option is used in the preferred embodiment for calls which are initially directed to the voice messaging system (i.e. calls which are not routed directly by the PBX to individual extensions). This option is more clearly illustrated by FIG. 4A. When a call is initially directed to the voice messaging system by the PBX, block 401, the caller is prompted by the voice messaging system to enter an extension number, block 402. The voice messaging system may further prompt the caller to enter zero to be connected with the operator and may prompt the caller that he/she will be automatically connected to the operator if the caller does nothing. If the caller enters an extension number, the voice messaging system "blind transfers" (the caller will hear PBX ring-back tone) the caller to the desired extension, block 403. If the call is not answered by the extension, branch 404, processing continues as illustrated in FIG. 4D.

The PBX forwarding scheme will forward the call to the voice messaging system on a ring-no-answer (the phone is not answered after a predetermined number of rings) or busy condition, block 431. The caller is then prompted with a message, for example "Joe Jones is not available. Please leave a private message at the tone, dial another extension or dial zero for personal assistance.", block 432. If personal assistance has not been specified for the desired extension, the prompt will state "dial zero for assistance" in place of "dial zero for personal assistance". In this case the call will be transferred to the PBX attendant in place of a personal assistant in response to the caller entering a zero.

If the person assigned to the desired extension has recorded a personal greeting, it will be played in place of "Joe Jones is not available".

When personal assistance is not available (i.e. the personal assistance extension is not answered or is busy), processing of the call is similar to the processing indicated in FIG. 3B, blocks 322 and 323, except the caller may be prompted with an additional option of pressing zero to be connected with the operator. This additional option is provided as a service to outside callers by the preferred embodiment. If the call is transferred to the operator, the call is transferred and announced by the voice messaging system as previously described.

Figure 4B:
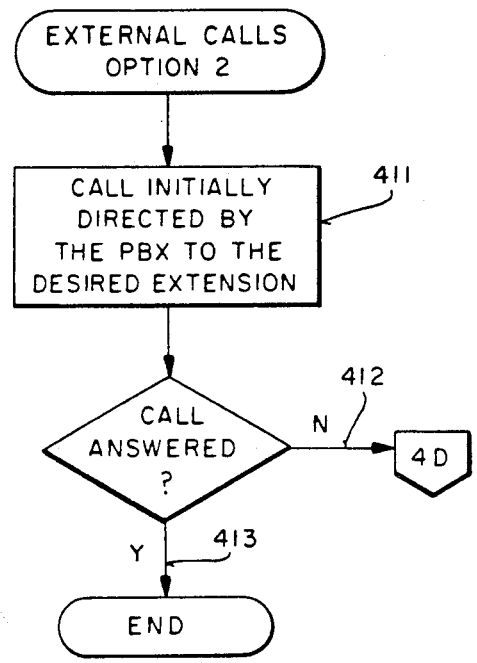
Figure 4D:
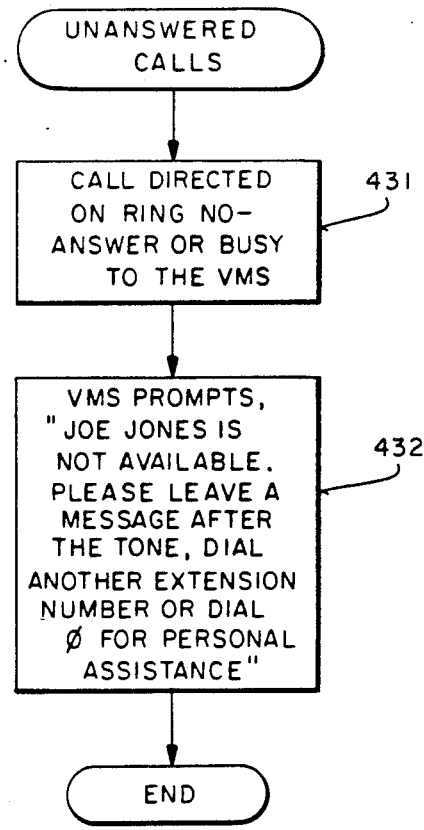

FIG. 4B illustrates a second option for processing of an external call used when the call is initially directed by the PBX to a desired extension such as may be the case with direct inward dial (D.I.D.) calls, block 411. If the call is answered by that desired extension, branch 413, no processing is required by the voice messaging system. If the call is not answered by the desired extension or the extension is busy, branch 412, processing of the call is done as illustrated by FIG. 4D, discussed previously.

A third voice messaging option is provided by the preferred embodiment for processing calls requiring special handling. An example may be a call which is initially directed to the president of the company and the president desires that all calls, as a default option, will be answered by a live person rather than allowing a message to be recorded.

When a call is forwarded to the voice messaging system from an extension designated for this special handling, either because the extension is busy or not answered after a predetermined number of rings, block 420, the voice messaging system provides a message such as "Joe Jones is unavailable. Please wait for personal assistance or press asterisk to leave a message", block 421. If the caller does not press the asterisk key within a predetermined amount of time, branch 422, the voice messaging system attempts to transfer the call to the personal assistance number designated for the mailbox, block 423.

If the personal assistance number answers, branch 424, the voice messaging system announces and connects the call, block 425, in the same manner discussed previously.

If the personal assistance extension is not answered or is busy, branch 426, the voice messaging system provides a prompt such as "Personal assistance is unavailable. Please stay on the line for the operator or press asterisk to leave a message.", block 427. If the caller does not press the asterisk key, branch 428, the voice messaging system connects the caller with the operator. Otherwise, if the caller presses the asterisk key either in response to this prompt, branch 429, or in response to the previous prompt, branch 430, the voice messaging system responds with a message such as "Please leave a private message at the tone for Joe Jones. Recording" and then the voice messaging system provides a beep tone, block 440, after which the caller may leave a message, block 441. If Joe Jones has created a personal greeting, the personal greeting will be played in place of "Please leave a private message at the tone for Joe Jones."

Although the invention has been described herein with reference to a specific embodiment, many modifications and variations therein will readily occur to those skilled in the art. Accordingly, all such variations and modifications are included within the intended scope of the present invention as defined by the following claims.

We claim:

1. A method for processing a telephone call in a telephone system, said telephone system comprising a switching means for switching said telephone call, a first telephone extension and a second telephone extension, said first and second telephone extensions coupled with said switching means, said telephone system further comprising a voice messaging system, said voice messaging system coupled with said switching means, and a first party being associated with said first telephone extension, said method comprising the steps of:
  (a) prior to receiving a telephone call, said first party storing information in said voice messaging system specifying said second extension for servicing telephone calls directed at said first extension when said first extension is unanswered;
  (b) said switching means directing said telephone call at said first telephone extension;
  (c) detecting said telephone call is not answered by said first telephone extension;
  (d) said voice message system providing a message to said telephone call, said message comprising information regarding the reason said first telephone extension did not answer said telephone call, said message further soliciting a caller response as to whether a caller placing said telephone call would like to leave a message for said first party or be transferred to a personal assistant of said first party;
  (e) said caller placing said telephone call indicating to said voice messaging system said telephone call is to be transferred to said personal assistant of said first party, said indication accomplished by the passing of a predetermined period of time during which said caller has not responded; and
  (f) said telephone system transferring said telephone call to said second extension responsive to step (e).

2. A method for processing a telephone call in a telephone system, said telephone system comprising a switching means for switching said telephone call, a first telephone extension a second telephone extension, said first and second telephone extensions coupled with said switching means, said telephone system further comprising a voice messaging system, said voice messaging system coupled with said switching means, and a first party being associated with said first telephone extension, said method comprising the steps of:
  (a) prior to receiving a telephone call, said first party storing information in said voice message system specifying said second extension for servicing telephone calls directed at said first extension when said first extension is unanswered;
  (b) said switching means directing said telephone call at said first telephone extension;
  (c) detecting said telephone call is not answered by said first telephone extension;
  (d) said voice massaging system providing a message to said telephone call, said message comprising information regarding the reason said first telephone extension did not answer said telephone call, said message further soliciting a caller response as to whether a caller placing said telephone call would like to leave a message for said first party or be transferred to a personal assistant of said first party;
  (e) said caller placing said telephone call indicating to said voice messaging system said telephone call is to be transferred to said personal assistant of said first party, said indication accomplished by the passing of a predetermined period of time during which said caller has not responded; and
  (f) said telephone system initiating a transfer of said telephone call to said second extension responsive to step (e);
  (g) detecting said telephone call is not answered by said second telephone extension;
  (h) said caller indicating to said voice messaging system the desire to leave a message; and
  (i) said voice message system prompting said caller to leave a voice message for said first telephone extension.

* * * * *